United States Patent
Kauhanen

(10) Patent No.: US 7,212,550 B2
(45) Date of Patent: May 1, 2007

(54) SYNCHRONIZATION METHOD AND SYNCHRONIZATION ARRANGEMENT

(75) Inventor: Jouni Kauhanen, Oulu (FI)

(73) Assignee: Nokia Corporation, Espoo (FI)

( * ) Notice: Subject to any disclaimer, the term of this patent is extended or adjusted under 35 U.S.C. 154(b) by 820 days.

(21) Appl. No.: 10/095,114

(22) Filed: Mar. 12, 2002

(65) Prior Publication Data

US 2002/0118669 A1 Aug. 29, 2002

Related U.S. Application Data

(63) Continuation of application No. PCT/FI00/00793, filed on Sep. 19, 2000.

(30) Foreign Application Priority Data

Sep. 30, 1999 (FI) .................................. 19992112

(51) Int. Cl.
*H04J 3/06* (2006.01)
(52) U.S. Cl. .................................... 370/503
(58) Field of Classification Search ................. 370/350, 370/503; 375/354, 356; 455/502
See application file for complete search history.

(56) References Cited

U.S. PATENT DOCUMENTS

| | | | | |
|---|---|---|---|---|
| 4,517,562 A | * | 5/1985 | Martinez | ............... 340/825.52 |
| 4,890,222 A | * | 12/1989 | Kirk | ............................ 713/400 |
| 5,245,634 A | | 9/1993 | Averbuch | |
| 5,251,191 A | | 10/1993 | Sturzl et al. | |
| 5,426,666 A | * | 6/1995 | Kato | ........................... 375/141 |
| 5,623,533 A | * | 4/1997 | Kikuchi et al. | ............. 455/572 |
| 5,687,139 A | * | 11/1997 | Budney | ....................... 368/10 |
| 5,945,813 A | * | 8/1999 | Kondou et al. | ............. 323/205 |

FOREIGN PATENT DOCUMENTS

WO  WO 99/50985  10/1999

OTHER PUBLICATIONS

Lewandowski et al., "GPS: Primary Tool for Time Transfer," Proceedings of the IEEE, vol. 87, No. 1, Jan. 1999, pp. 163-172.
Hseieh et al., "Phase-Locked Loop Techniques—A Survey," IEEE Transactions on Industrial Electronics, vol. 43, No. 6, Dec. 1996, pp. 609-615.
Stallings, "Data and Computer Communications," 6th edition, Prentice Hall, 2000, pp. 177-178.
Agilent Technologies; "Agilent 5071A Primary Frequency Standard Unsurpassed Stability in the Lab or Field," product overview, 12 pp.
Selander, Power-Line Communications, Channel Properties and Communication Strategies, 1999, 110 pp. (Thesis).
Lewandowski, W. et al., "GPS: Primary Tool for Time Transfer," Proceedings of the IEEE, vol. 43 (No. 6), pp. 163-172, (Jan. 1999).
Guan-Dhyun Hsieh et al., "Phase-Locked Loop Techniques—A Survey," IEEE Transactions on Industrial Electronics, vol. 43 (No. 6), pp. 609-615, (Dec. 1996).

* cited by examiner

*Primary Examiner*—Ajit Patel
(74) *Attorney, Agent, or Firm*—Pillsbury Winthrop Shaw Pittman LLP

(57) ABSTRACT

The invention relates to a method and arrangement for synchronizing a base station in a radio system. In the solution, a synchronization signal is transmitted in a cable for transferring electric power, from which cable the base station filters the synchronization signal and synchronizes its operation according to the synchronization signal.

12 Claims, 4 Drawing Sheets

SYNCHRONIZATION METHOD AND SYNCHRONIZATION ARRANGEMENT

FIELD OF THE INVENTION

This application is a Continuation of International Application PCT/FI00/00793 filed Sep. 19, 2000 which designated the U.S. and was published under PCT Article 21(2) in English, and further claims priority to Finnish application No. 19992112, filed Sep. 30, 1999, the contents of both of which are incorporated herein in their entirety by reference.

The invention relates to a synchronization method and a synchronization arrangement particularly for a base station in a radio system.

BACKGROUND OF THE INVENTION

Since the data transmission between a base station and a terminal in a radio system is usually carried out synchronically, the transmission of the base station has to be synchronized all the time. In TDMA systems, the connection is commonly also circuit-switched. The prior art solutions usually utilize hierarchic or plesiochronous synchronization, in which case the base station receives a synchronization signal from a base station controller and the base station controller, in turn, receives the synchronization signal from a mobile services switching centre, etc. A public telephone system and a radio system are normally synchronized at their highest level with an atomic clock which is as accurate as possible. The synchronization signal, which is a signal having a nominal frequency of about 2 MHz, for example, can be transmitted from the base station controller to the base station through a separate cable or over a radio path. The radio connection to the base station controller is not, however, always possible owing to great distance, signal load or the location of the base station. On the other hand, however, using a separate cable causes several problems. Installing a cable is laborious since an under-ground cable has to be buried in the ground and an overhead cable usually requires poles and supports of its own. When the location of the base station changes even slightly, extensive re-installing procedures will be required. Furthermore, it is also expensive to install a cable.

BRIEF DESCRIPTION OF THE INVENTION

An object of the invention is thus to provide a method and an apparatus implementing the method so as to enable the above-mentioned problems to be alleviated. This is achieved with a method of synchronizing a base station connected to a cable for transferring electric power. The method comprises supplying a synchronization signal to the cable for transmitting electric power, from which cable the base station filters the synchronization signal and synchronizes its operation according to the synchronization signal.

The invention further relates to an arrangement for synchronizing a base station in a radio system, the base station being connected to a cable for transferring electric power. Furthermore, the arrangement is arranged to supply a synchronization signal to the cable for transmitting electric power, the base station being arranged to receive the synchronization signal from the cable and to synchronize its operation according to the synchronization signal.

Preferred embodiments of the invention are disclosed in the dependent claims.

The underlying idea of the invention is thus the way in which the synchronization signal is supplied to the base station; therefore, the character of the synchronization signal is less essential since synchronization by means of a synchronization signal is known per se.

Several advantages are achieved by the method and arrangement of the invention. No radio connection to the base station controller is necessary, so problems relating to too great a distance between the base station and the base station controller, signal load of the base station or the location of the base station are avoided. Furthermore, the use a separate cable and the related problems are avoided, such as installing the cable into the ground or the air and destroying the structures of a building for the installation. Further, cable re-installing procedures are avoided when the location of the base station changes. The inventive solution is also economically advantageous since no separate syncronization cable is necessary.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

The solution of the invention can be applied to synchronization of a base station in a radio system. The inventive solution is suited particularly to frequency synchronization and frame synchronization.

Figure 1A:
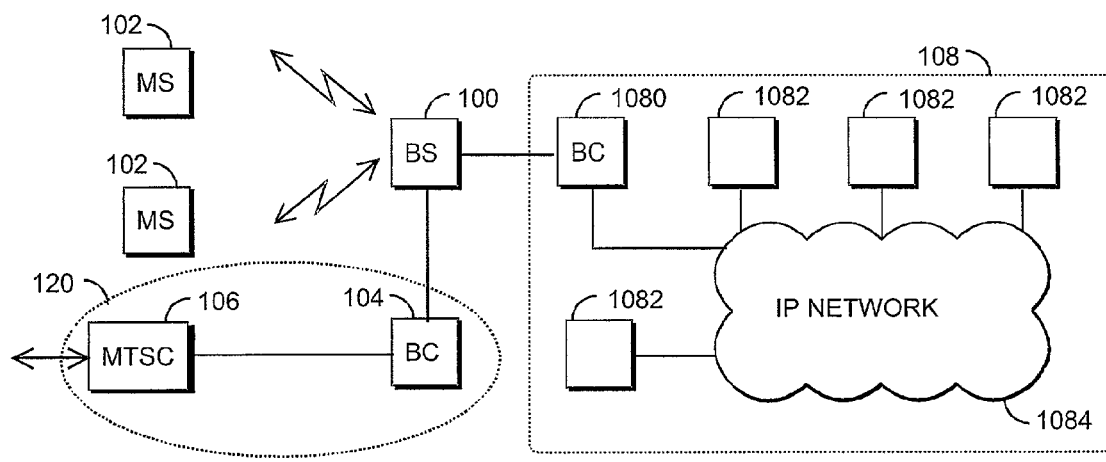
FIG. 1A shows a radio system connected to a local network.

Referring to FIG. 1A, examine first a prior art solution comprising a radio system connected to a local network. A typical radio system comprises a base station 100 communicating over a radio path with terminals 102, usually mobile telephones. A base station controller 104 controls one or more base stations 100 in a known manner. A mobile services switching centre 106, in turn, controls one or more mobile services switching centres in a known manner. The radio system comprises the terminals 102 and a network part 120 comprising the base station 100, base station controller 104 and mobile services switching centre 106. In the prior art solutions, a local network 108 and the radio system are interconnected usually such that the base station 100 of the radio system communicates with a base station controller 1080 of the local network 108. The local network is often asynchronous, in which case an IP (Internet Protocol) network 1084 or another non-circuit-switched local network, for example, serves as the backbone. The data transmission of the IP network 1084 is packet-switched and the data transmission rate depends on the load. The base stations 100 in the radio system, in turn, communicate over the radio path with the terminals 102 in their coverage areas in a manner of circuit-switched data transmission.

Examine now the packet-switched data transmission in closer detail. In packet-switched data transmission, an asynchronous connection is established between a transmitter and a receiver by transmitting data as packets comprising, in addition to the actual information, address and control information. Packet switching is a method in which several connections may simultaneously use the same transmission channel and the data transmission connection is reserved separately for the duration of the transmission of each packet. This means cost and capacity savings while building and using the network. In order for the data transmission to be fast enough, applications utilizing packet switching require great reliability of the transmission in order to avoid retransmission, for example. Circuit switching, in turn, is a method in which the channel is reserved for the transmitter and the receiver regardless of whether or not data is being transmitted, which is why address and control information is not necessarily required.

The local network 108 comprises an adapting device 1080 for converting the asynchronous and packet-switched data transmission of the local network 108 to the synchronous and circuit-switched data transmission of the radio system. The adapting device 1080 receives the synchronization signal from the base station 100, by means of which the adapting device 1080 synchronizes the asynchronous data propagating from the local network 108 towards the radio system and transmits the data in the synchronous form to the base station 100. The adapting device 1080 also packs the synchronized data supplied from the base station 100 into packet-switched data and transmits the data in the local network 108 to the receiver. The local network may also comprise other devices 1082 irrelevant to the invention, such as controllers, servers, terminals, registers and connecting devices.

Figure 1B:
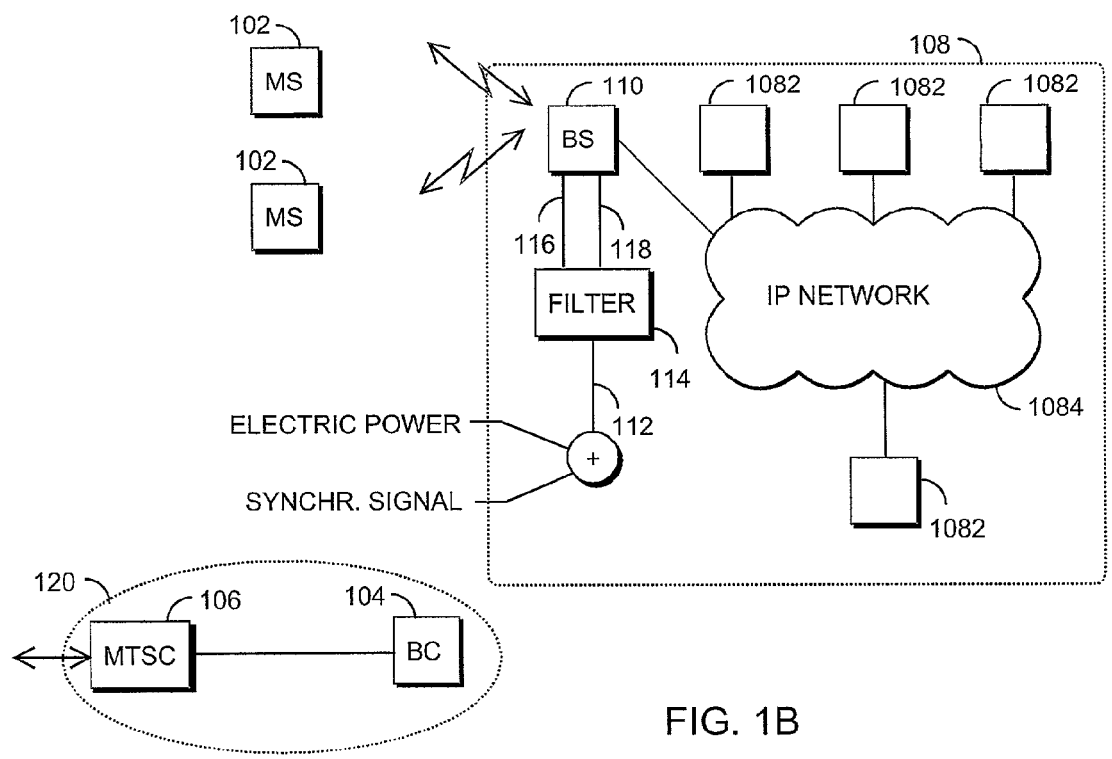
FIG. 1B shows a radio system whose base station is part of the local network.

FIG. 1B shows a situation to which the inventive solution is applied and in which the functions of the base station 100 and the adapting device 1080 are combined in a base station 110, and the location of the base station 110 has (as if) moved into the area of the local network 108. In such a case, a cable connection between the base station controller 104 and the base station 110 becomes problematic since the base station 110 is then often placed inside a building. The cable would then necessitate the ground or streets in a city to be excavated and the structures of the building to be destroyed. Furthermore, it is not normally advisable for the base station controller 104 to use the radio connection for synchronizing the base station because the radio connection would increase the traffic load of the base station 110. In the inventive solution, the synchronization signal is transmitted to the base station 110 in a cable 112 for electric operation, i.e. in a cable for transferring electric power. The cable for transferring electric power does not have to be separately installed since cables for transferring electric power are usually placed in buildings when still being built. The base station 110 comprises a filter 114 for separating the synchronization signal, which propagates through a conductor 118 to the electronic circuits of the base station which need synchronization. As its power source, the base station 110 may also utilize the electric power obtained from the electric cable, in which case the filter 114 separates the electric power necessary for operating which propagates to the electronic circuits of the base station 110 through a cable 116 and the synchronization signal.

Figure 2A:
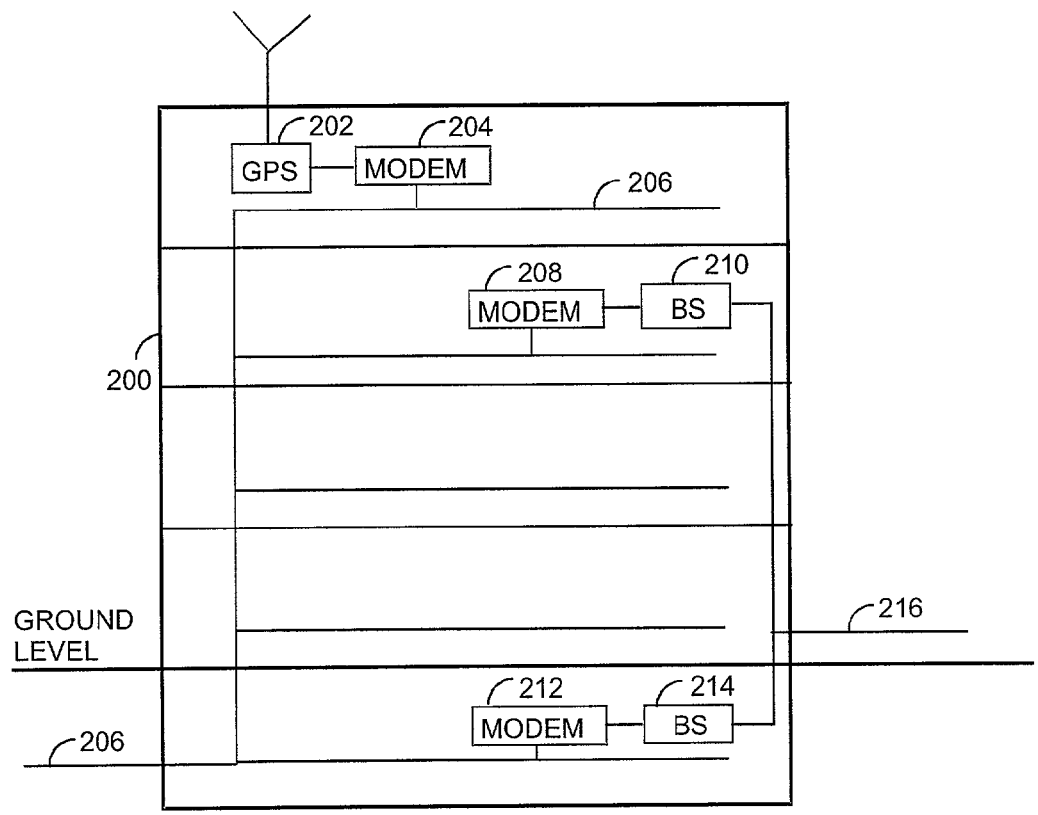
FIG. 2A shows synchronization of a base station by means of a GPS signal.

FIG. 2A shows an inventive solution utilizing a GPS system for synchronizing a base station, each GPS satellite in the GPS system transmitting two signals having frequencies slightly over 1 GHz. In the exemplary case of FIG. 2A, base stations 210 and 214 are located on different floors in a multi-storied building. A GPS receiver 202 typically receives several GPS signals, which can be used for determining the location of the GPS receiver at an inaccuracy of less than 200 m, and the time at an inaccuracy of less than 400 ns. Since the frequencies of the signals transmitted by the GPS satellites are exactly specified (1575.42 MHz and 1227.60 MHz), a synchronization signal having an exact frequency can be generated in the GPS receiver 202 for the base stations 210 and 214. Using a modem 204, the synchronization signal is supplied to an electric cabling system 206 in a building 200, which is preferably a public electrical network. The base stations 210, 214, in turn, comprise modems 208, 212 by means of which the base stations 210, 214 receive at least the synchronization signal from the electric cabling system 206. The modems 208, 212 comprise a filter for separating the synchronization signal and the electric power. The base stations 210, 214 are connected to a local network 216. The base stations 210, 214 also preferable receive the electric power necessary for themselves from the electric cabling system 206. The GPS system is described in closer detail for example in publication GPS: Primary Tool for Time Transfer, Lewandowski, W. Asoubib, J. Klepczynski W., Proceedings of the IEEE, vol. 87, no.1, January 1999, which is incorporated herein by reference.

Figure 2B:
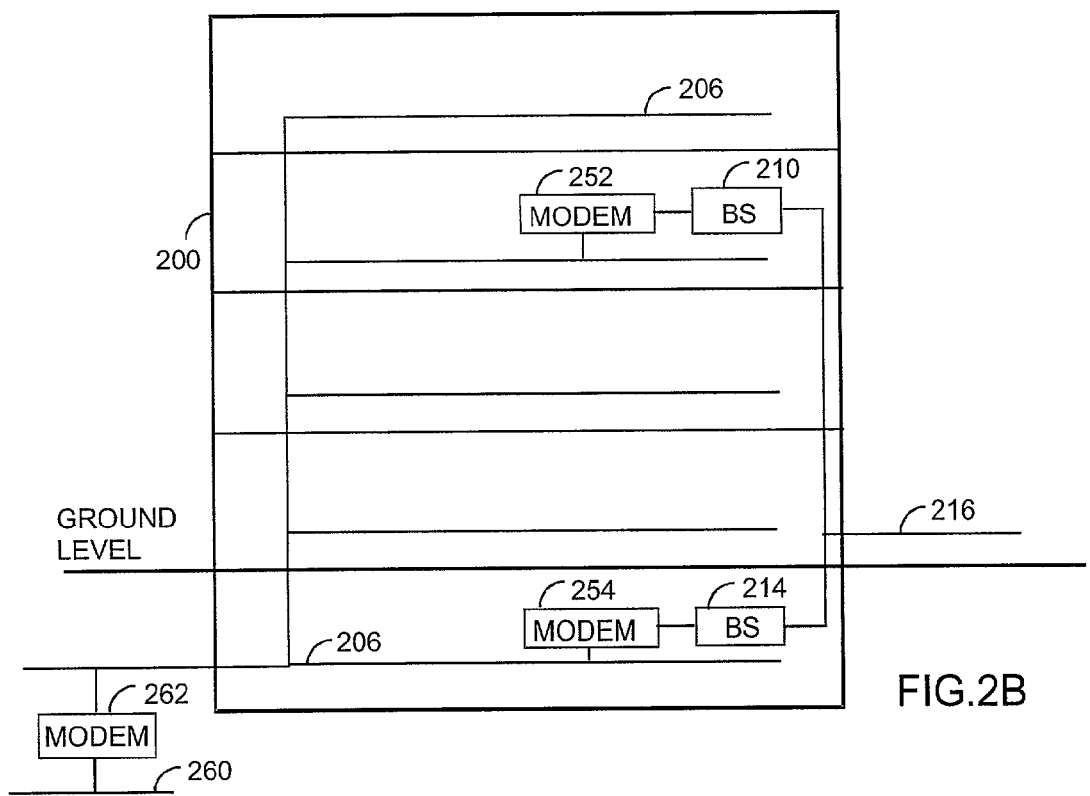
FIG. 2B shows synchronization of the base station by means of a public telephone network.
Figure 3:
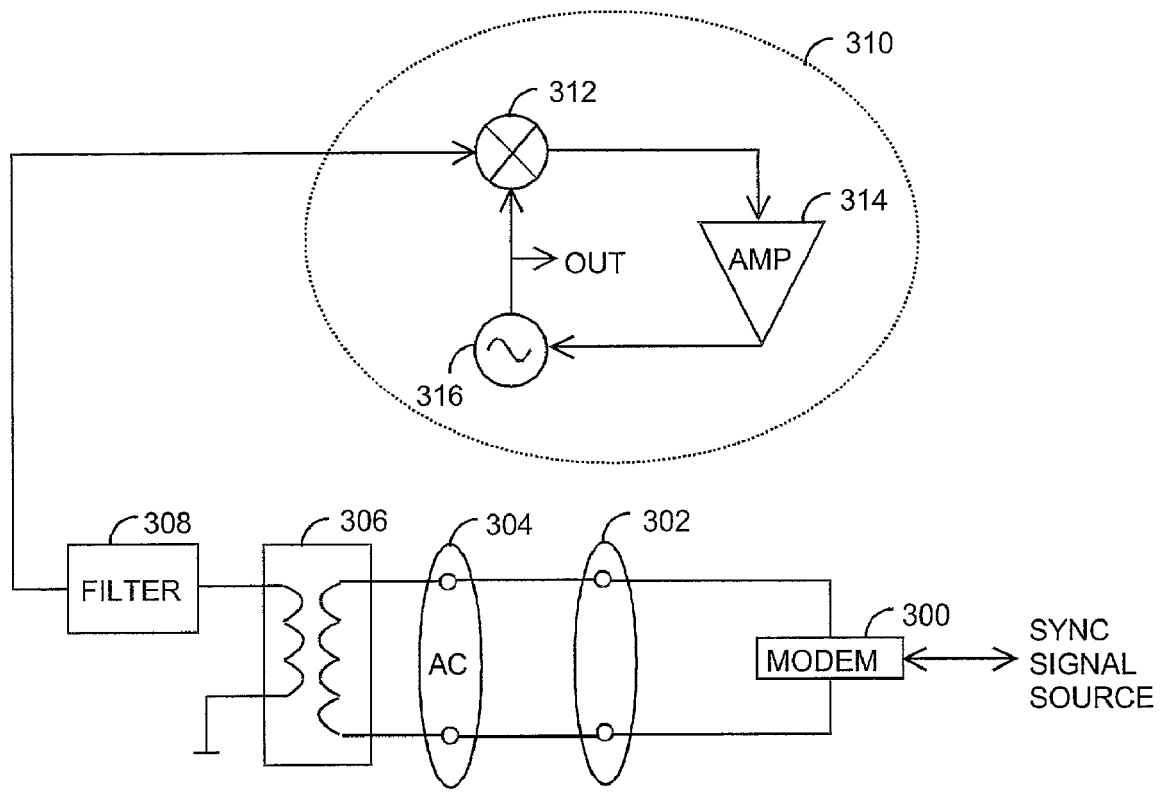
FIG. 3 shows synchronization by using a phase-locked circuit.

The situation in FIG. 2B is highly similar to that of FIG. 2A. Now, however, the base stations 210, 214 utilize the synchronization signal transmitted in the public telephone network 260. In the inventive solution, the synchronization signal may also be received from the public telephone network. In telephone systems utilizing PCM (Pulse Code Modulation) modulation, a centre at an upper level transmits a synchronization signal through a PCM trunk circuit to a centre at a lower level, the nominal frequency of the synchronization signal being 2.048 MHz or a multiple thereof (as far as the invention is concerned, the frequency may also be another known frequency). The centre at a lower level, such as a base station, locks to this synchronization signal by means of a phase-locked loop as shown in FIG. 3. From the public telephone network 260, the synchronization signal is connected to the cable 206 for transferring electric power by means of a modem 262.

FIG. 3 shows a solution for detecting a sine-shaped synchronization signal supplied to an electrical network. The frequency of the synchronization signal is selected according to the laws and provisions in force in a given country. The synchronization signal may be, for example, a 100 kHz sine signal. A modem 300 supplies the synchronization signal to the electrical network through poles 302. Using a converter 306, a suitable operating voltage is produced for the base station from output poles 304 of the electrical network. The operating voltage is also supplied to a filter 308, which preferably band-pass-filters the synchronization signal. In order for the phase of the synchronization signal not to change, phase detection is necessary. The phase is preferably monitored by a phase-locked loop 310 comprising a phase detector 312, wherein the signal supplied from an oscillator and the received signal are multiplied, for example. The multiplication gives a signal which corresponds to the phase difference of the multiplied signals and which propagates to an amplifier or another feedback unit 314 known to one skilled in the art. An amplified difference signal is used for controlling an oscillator 316 to adopt the same phase as the incoming signal. An output signal of the oscillator 316 serves as the synchronization signal of the base station. The beginning and end of a frame can be indicated in the synchronization signal as a change in frequency by using FSK (Frequency Shift Keying) modulation. The starting moment of the frame can then be indicated by the frequency becoming higher, changing from 100 kHz to 120 kHz, for example. The operation of the phase-locked loop is described in closer detail for example in publication Guan-Chyun Hsieh, James C. Hung, Phase-Locked Loop Techniques—A Survey, IEEE Transactions on Industrial Electronics, Vol. 43, No. 6, December 1996, which is incorporated herein by reference.

Figure 4:
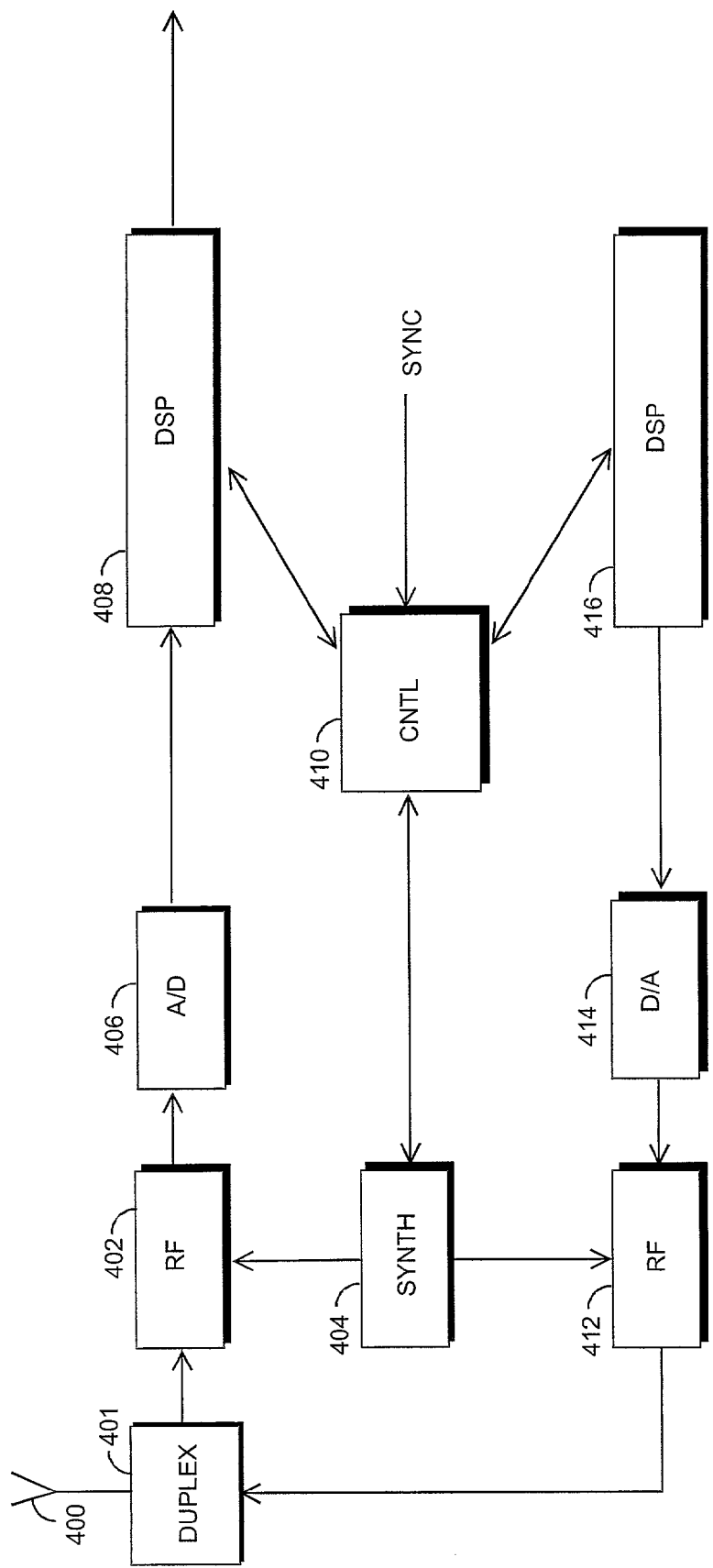
FIG. 4 is a block diagram of a base station.

FIG. 4 is a block diagram of a base station. The base station comprises an antenna 400 for receiving a signal. The received signal propagates to RF means 402, in which the received RF signal is converted to a baseband signal by multiplying it by the frequency of a local oscillator 404. The baseband signal is converted to a digital signal in an A/D converter 406, after which the received signal propagates to a digital signal processing part 408 and further to the other parts in the radio system. When being transmitted, the signal is processed in a digital signal processing part 416. The digital signal is converted to an analogue signal in a D/A converter 414 and the analogue signal is multiplied by an RF carrier wave in RF means 412, which receive the carrier wave from the local oscillator 404. The RF signal is transmitted through the antenna 400. A control block 410, which controls particularly the frequency and digital signal processing of the local oscillator, controls the operation of the base station. The synchronization signal is supplied to the control block 410, by means of which the frequency, and, if necessary, also the phase, of the carrier wave of the base station can be made appropriate. In addition, the timing of the frames in the frame-structured data transmission can be made appropriate by monitoring the change in frequency of the FSK synchronization signal. The receiving and transmitting functions are separated in a known manner by a filter 401, which is preferably a duplex filter.

The operation of the base station can be checked by using the accurate local oscillator 404. In such a case, if the synchronization signal gets lost, this will not have an immediate effect on the operation of the base station since the local oscillator stays at the frequency and phase of the synchronization signal for a long time without being compared to the synchronization signal.

The synchronization solution of the invention may also be utilized in location determination. Accurate synchronization enables the base station to utilize accurate signalling timing and reference frequency, which, as is obvious to one skilled in the art, also improve the accuracy of location determination.

The radio system of the invention is preferably a radio system utilizing TDMA (Time Division Multiple Access) method, such as a GSM (Global System for Mobile communication) radio system. In the solution of the invention, the functions of a network part can preferably be implemented by software to be carried out in a processor of each actuator. The actuators in the network element can be implemented as a hardware solution, by VLSI (Very Large Scale Integrated circuit) components or ASIC (Application Specific Integrated Circuit) circuit technique, for example.

Although the invention has been described above with reference to the example according to the accompanying drawings, it is obvious that the invention is not restricted thereto but can be modified in many ways within the scope of the inventive idea disclosed in the attached claims.

The invention claimed is:

1. A method of synchronizing a base station in a radio system, the base station being connected to a cable for transferring electric power, the method comprising supplying a synchronization signal to the cable for transmitting electric power, from which cable the base station filters the synchronization signal and synchronizes its operation according to the synchronization signal, and supplying the synchronization signal from a public telephone network to the cable for transferring electric power.

2. A method as claimed in claim 1, wherein the cabling for transmitting electric power is a public electrical network, to which the synchronization signal is supplied.

3. A method as claimed in claim 2, receiving by the base station both the electric power necessary for itself and the electric power of the synchronization signal from the cable for transferring electric power.

4. A method as claimed in claim 1, receiving a GPS signal by a GPS receiver and generating the synchronization signal by means of the GPS signal, and supplying the synchronization signal to the cable for transferring electric power.

5. A method as claimed in claim 1, wherein the synchronization signal also comprises information on the timing of the frames of the data transmission.

6. A method as claimed in claim 5, indicating the boundary of a frame by a change in the frequency of the synchronization signal.

7. Arrangement for synchronizing a base station in a radio system, the base station being connected to a cable for transferring electric power, wherein the arrangement is arranged to supply a synchronization signal to the cable for transmitting electric power, the base station being arranged to receive the synchronization signal from the cable and to synchronize its operation according to the synchronization signal, and wherein the arrangement is arranged to supply the synchronization signal from a public telephone network to the cable for transferring electric power.

8. An arrangement as claimed in claim 7, wherein the cable for transferring electric power is a public electrical network and the arrangement is arranged to supply the synchronization signal to the public electrical network.

9. An arrangement as claimed in claim 8, wherein the base station receives both the electric power necessary for itself and the electric power of the synchronization signal from the cable for transferring electric power.

10. An arrangement as claimed in claim 7, wherein the arrangement comprises a GPS receiver for receiving a GPS signal, and the arrangement is arranged to generate the synchronization signal by means of the GPS signal, the arrangement being arranged to supply the synchronization signal to the cable for transferring electric power.

11. An arrangement as claimed in claim 7, wherein the arrangement is arranged to generate a synchronization signal which also comprises information on the timing of the frames of the data transmission.

12. An arrangement as claimed in claim 11, wherein in order to time the frames, the arrangement is arranged to indicate a boundary of a frame by a change in the frequency of the synchronization signal.

* * * * *